(12) United States Patent  
Vujcic

(10) Patent No.: US 9,113,428 B2  
(45) Date of Patent: Aug. 18, 2015

(54) POWER HEADROOM REPORTING

(75) Inventor: Dragan Vujcic, Limours (FR)

(73) Assignee: LG Electronics Inc., Seoul (KR)

( * ) Notice: Subject to any disclaimer, the term of this patent is extended or adjusted under 35 U.S.C. 154(b) by 265 days.

(21) Appl. No.: 13/817,342

(22) PCT Filed: Aug. 12, 2011

(86) PCT No.: PCT/KR2011/005929  
§ 371 (c)(1),  
(2), (4) Date: Apr. 19, 2013

(87) PCT Pub. No.: WO2012/023759  
PCT Pub. Date: Feb. 23, 2012

(65) Prior Publication Data  
US 2013/0223406 A1    Aug. 29, 2013

Related U.S. Application Data

(60) Provisional application No. 61/374,574, filed on Aug. 17, 2010.

(51) Int. Cl.  
| | |
|---|---|
| *H04W 52/36* | (2009.01) |
| *H04L 5/00* | (2006.01) |
| *H04W 52/14* | (2009.01) |
| *H04W 52/28* | (2009.01) |
| *H04W 8/24* | (2009.01) |
| *H04W 72/00* | (2009.01) |
| *H04W 72/12* | (2009.01) |
| *H04W 88/02* | (2009.01) |
| *H04W 52/34* | (2009.01) |

(52) U.S. Cl.  
CPC .............. *H04W 52/365* (2013.01); *H04L 5/001* (2013.01); *H04L 5/006* (2013.01); *H04L 5/0098* (2013.01); *H04W 52/146* (2013.01); *H04W 52/281* (2013.01); *H04W 8/24* (2013.01); *H04W 52/34* (2013.01); *H04W 72/00* (2013.01); *H04W 72/12* (2013.01); *H04W 88/02* (2013.01)

(58) Field of Classification Search  
CPC ... A61N 1/37229; H04L 5/001; H04W 24/10; H04W 52/146; H04W 52/34; H04W 52/365; H04W 52/367; H04W 52/387; H04W 72/0413  
See application file for complete search history.

(56) References Cited

U.S. PATENT DOCUMENTS

2006/0003787 A1* 1/2006 Heo et al. ........................ 455/522  
2007/0281695 A1* 12/2007 Lohr et al. ..................... 455/436

(Continued)

OTHER PUBLICATIONS

Mediatek, 'Per UE PHR for carrier aggregation.' 3GPP TSG-RAN WG1 Meeting #61bis, R1-103743, Jun. 28-2 Jul. 20. (Retrieved from the Internet on Mar. 22, 2012: <URL: http://www.3gpp.org/ftp/tsg_ran/wg1_rl1/tsgr1_61b/docs>).  
HTC, Power Headroom Reporting. 3GPP TSG-RAN WG1 #61, R1-102732, May 10-14, 2010. (Retrieved from the Internet on Mar. 22, 2012: <URL: http://www.3gpp.org/ftp/tsg_ran/WG1_RL1/TSGR1_61/Docs>).

*Primary Examiner* — Yong Zhou  
(74) *Attorney, Agent, or Firm* — Dentons US LLP

(57) ABSTRACT

The disclosure relates to a method for a method for a user equipment configured in carrier aggregation mode to assist an e Node B in estimating the total available output power for each component carrier. The method comprises reporting from the user equipment to the e Node B at least one of RF architecture information of the user equipment, and at least one power parameter value. The disclosure also relates to the corresponding e Node B, user equipment, computer program and storage medium.

9 Claims, 5 Drawing Sheets

(56) References Cited

U.S. PATENT DOCUMENTS

| | | | |
|---|---|---|---|
| 2010/0111023 A1* | 5/2010 | Pelletier et al. | 370/329 |
| 2010/0158147 A1* | 6/2010 | Zhang et al. | 375/260 |
| 2010/0273515 A1* | 10/2010 | Fabien et al. | 455/509 |
| 2013/0215849 A1* | 8/2013 | Heo et al. | 370/329 |

* cited by examiner

POWER HEADROOM REPORTING

This Application is a 35 U.S.C. §371 National Stage Entry of International Application No. PCT/KR2011/005929 filed Aug. 12, 2011 and claims the benefit of U.S. Provisional Application No. 61/374,574 filed Aug. 17, 2010, all of which are incorporated by reference in their entirety herein.

TECHNICAL FIELD

The disclosure relates to power headroom reporting, in particular in the context of carrier aggregation management in a radiocommunication system.

BACKGROUND ART

Many different types of radiocommunication systems (i.e. networks) exist. GSM, UMTS, LTE and LTE-advanced are non-limiting examples of such radiocommunication systems.

FIG. 1 is a block diagram showing a radiocommunication system. This may be a network structure of a 3rd generation partnership project (3GPP) long term evolution (LTE)/LTE-advanced (LTE-A). An E-UTRAN (Evolved-UMTS Terrestrial Radio Access Network) includes at least one base station (BS) 20 providing a user plane and a control plane towards a user equipment (UE) 10. The UE can be fixed or mobile and can be referred to as another terminology, such as a MS (Mobile Station), a UT (User Terminal), a SS (Subscriber Station), MT (mobile terminal), a wireless device, or the like. The BS 20 may be a fixed station that communicates with the UE 10 and can be referred to as another terminology, such as an e-NB (evolved-NodeB), a BTS (Base Transceiver System), an access point, or the like. There are one or more cells within the coverage of the BS 20. Interfaces for transmitting user data or control data can be used between BSs 20 (in the present document, the term "data" is used as a synonymous for "traffic" and does not imply any limitation as to the nature of such data, which can refer e.g. to user traffic or control traffic i.e. signaling). The BSs 20 are interconnected with each other by means of an X2 interface. The BSs 20 are also connected by means of the S1 interface to the EPC (Evolved Packet Core). They may interface to the aGW (E-UTRAN Access Gateway) via the S1. In the example shown in FIG. 1, the BSs 20 are more specifically connected to the MME (Mobility Management Entity) by means of the S1-MME and to the Serving Gateway (S-GW) by means of the S1-U. The S1 interface supports a many-to-many relation between MME/S-GW 30 and the BS 20.

Hereinafter, downlink means communication from the BS 20 to the UE 10, and uplink means communication from the UE 10 to the BS 20. In downlink, a transmitter may be a part of the BS 20 and a receiver may be a part of the UE 10. In uplink, a transmitter may be a part of the UE 20 and a receiver may be a part of the BS 20.

FIG. 2 gives an overview of the E-UTRAN architecture where:
  eNB, aGW Control Plane and aGW User Plane boxes depict the logical nodes;
  The boxes within the eNB box from RRC to Inter Cell RRM as well as the boxes SAE Bearer Control and MM Entity within the aGW Control Plane box depict the functional entities of the control plane; and
  The boxes within the eNB box from PHY to RLC depict the functional entities of the user plane.

Functions agreed to be hosted by the eNB are: Selection of aGW at attachment; Routing towards aGW at RRC activation; Scheduling and transmission of paging messages; Scheduling and transmission of BCCH information; Dynamic allocation of resources to UEs in both uplink and downlink; The configuration and provision of eNB measurements; Radio Bearer Control; Radio Admission Control; Connection Mobility Control in LTE_ACTIVE state.

Functions agreed to be hosted by the aGW are: Paging origination; LTE_IDLE state management; Ciphering of the user plane; PDCP; SAE Bearer Control; Ciphering and integrity protection of NAS signaling.

FIG. 3 shows the user-plane protocol stack for E-UTRAN.

RLC (Radio Link Control) and MAC (Medium Access Control) sublayers (terminated in eNB on the network side) perform the functions such as Scheduling, ARQ (automatic repeat request) and HARQ (hybrid automatic repeat request).

PDCP (Packet Data Convergence Protocol) sublayer (terminated in aGW on the network side) performs for the user plane functions such as Header Compression, Integrity Protection, Ciphering.

FIG. 4 shows the control-plane protocol stack for E-UTRAN. The following working assumptions apply.

RLC and MAC sublayers (terminated in eNB on the network side) perform the same functions as for the user plane;

RRC (Radio Resource Control) (terminated in eNB on the network side) performs the functions such as: Broadcast; Paging; RRC connection management; RB control; Mobility functions; UE measurement reporting and control.

PDCP sublayer (terminated in aGW on the network side) performs for the control plane the functions such as: Integrity Protection; Ciphering.

NAS (terminated in aGW on the network side) performs among other things: SAE bearer management; Authentication; Idle mode mobility handling; Paging origination in LTE_IDLE; Security control for the signaling between aGW and UE, and for the user plane.

RRC uses the following states:
  1. RRC_IDLE:
  UE specific DRX configured by NAS; Broadcast of system information; Paging; Cell re-selection mobility; The UE shall have been allocated an id which uniquely identifies the UE in a tracking area; No RRC context stored in the eNB.
  2. RRC_CONNECTED:
  UE has an E-UTRAN-RRC connection; UE has context in E-UTRAN; E-UTRAN knows the cell which the UE belongs to; Network can transmit and/or receive data to/from UE; Network controlled mobility (handover); Neighbour cell measurements; At RLC/MAC level: UE can transmit and/or receive data to/from network; UE also reports channel quality information and feedback information to eNB.

The network signals UE specific paging DRX (Discontinuous Reception) cycle. In RRC Idle mode, UE monitors a paging at a specific paging occasion of every UE specific paging DRX cycle. The paging occasion is a time interval where a paging is transmitted. UE has its own paging occasion. A paging message is transmitted over all cells belonging to the same tracking area. If UE moves from a tracking area to another tracking area, UE will send a tracking area update message to the network to update its location.

A physical channel transfers signaling and data between UE L1 and eNB L1. As shown in FIG. 5, the physical channel transfers them with a radio resource which consists of one or more sub-carriers in frequency and one more symbols in time. 6 or 7 symbols constitute one sub-frame which is 0.5 ms in length. The particular symbol(s) of the sub-frame, e.g. the first symbol of the sub-frame, can be used for the PDCCH (Physical Downlink Control Channel). PDCCH channel carries L1 signaling.

A transport channel transfers signaling and data between L1 and MAC layers. A physical channel is mapped to a transport channel.

Downlink transport channel types are:

1. Broadcast Channel (BCH) used for transmitting system information
2. Downlink Shared Channel (DL-SCH) characterised by: support for HARQ; support for dynamic link adaptation by varying the modulation, coding and transmit power; possibility to be broadcast in the entire cell; possibility to use beamforming; support for both dynamic and semi-static resource allocation
3. Paging Channel (PCH) used for paging a UE
4. Multicast Channel (MCH) used for multicast or broadcast service transmission.

Uplink transport channel types are:

1. Uplink Shared Channel (UL-SCH) characterised by: possibility to use beamforming; (likely no impact on specifications); support for dynamic link adaptation by varying the transmit power and potentially modulation and coding; support for HARQ
2. Random Access Channel(s) (RACH) used normally for initial access to a cell.

The MAC sublayer provides data transfer services on logical channels. A set of logical channel types is defined for different kinds of data transfer services as offered by MAC. Each logical channel type is defined by what type of information is transferred.

A general classification of logical channels is into two groups:

Control Channels (for the transfer of control plane data);
Traffic Channels (for the transfer of user plane data).

Control channels are used for transfer of control plane data only. The control channels offered by MAC are:

Broadcast Control Channel (BCCH)
A downlink channel for broadcasting system control information Paging Control Channel (PCCH)
A downlink channel that transfers paging information. This channel is used when the network does not know the location cell of the UE.

Common Control Channel (CCCH)
this channel is used by the UEs having no RRC connection with the network.

Multicast Control Channel (MCCH)
A point-to-multipoint downlink channel used for transmitting MBMS control data from the network to the UE.

Dedicated Control Channel (DCCH)
A point-to-point bi-directional channel that transmits dedicated control data between a UE and the network. Used by UEs having an RRC connection.

Traffic channels are used for the transfer of user plane data only. The traffic channels offered by MAC are:

Dedicated Traffic Channel (DTCH)
A Dedicated Traffic Channel (DTCH) is a point-to-point channel, dedicated to one UE, for the transfer of user data. A DTCH can exist in both uplink and downlink.

Multicast Traffic Channel (MTCH)
A point-to-multipoint downlink channel for transmitting traffic data from the network to the UE.

In Uplink, the following connections between logical channels and transport channels exist:

DCCH can be mapped to UL-SCH;
DTCH can be mapped to UL-SCH.

In Downlink, the following connections between logical channels and transport channels exist:

BCCH can be mapped to BCH;
PCCH can be mapped to PCH;
DCCH can be mapped to DL-SCH;
DTCH can be mapped to DL-SCH;
MCCH can be mapped to MCH;
MTCH can be mapped to MCH;

Conventionally, only one carrier (e.g. a frequency band) is used at a time with respect to a given UE for transporting data, such as useful data and/or control data.

But for supporting wider transmission bandwidths, it would be better to use carrier aggregation, that is simultaneous support of multiple carriers. Carrier aggregation would thus involve transporting data, such as useful data and/or control data, over a plurality of carriers with respect to a given UE. It would thus enhance the conventional carrier usage and be adapted to the multiple access type of the considered radio communication system.

As far as LTE is concerned, carrier aggregation has been introduced in a recent version thereof, so-called LTE-Advanced, which extends LTE Release 8 (LTE Rel-8). Some aspects of carrier aggregation are disclosed for example in 3GPP TR 36.814 V0.4.1, 3rd Generation Partnership Project; Technical Specification Group Radio Access Network; Further Advancements for E-UTRA Physical Layer Aspects (Release 9) released in February 2009 (see section 5 in particular), as well as in subsequent versions thereof. Other standard documents, which are well known by one skilled in the art, relate to other aspects of carrier aggregation.

Thus LTE-Advanced allows having two or more carriers, so-called component carriers (CCs), aggregated in order to support wider transmission bandwidths e.g. up to 100 MHz and for spectrum aggregation.

In contrast with an LTE Rel-8 terminal, an LTE-Advanced terminal with reception and/or transmission capabilities for carrier aggregation can simultaneously receive and/or transmit on multiple component carriers.

According to a non-limiting example, a carrier may be defined by a bandwidth and a center frequency. If five carriers are assigned as granularity of carrier unit having a 5 MHz bandwidth, carrier aggregation may lead to a bandwidth of a maximum of 20 MHz.

Contiguous spectrum aggregation and/or non-contiguous spectrum aggregation may take place. The contiguous spectrum aggregation uses contiguous carriers and the non-contiguous spectrum aggregation uses non-contiguous carriers. The number of aggregated carriers may be different in uplink and downlink. When the number of downlink carriers and that of uplink carriers are equal, it is called a symmetric aggregation, and when the numbers are different, it is called an asymmetric aggregation.

The size (i.e., the bandwidth) of multiple carriers may vary. For example, when five carriers are used to configure a 70 MHz band, they may be configured as 5 MHz carrier (carrier #0)+20 MHz carrier (carrier #1)+20 MHz carrier (carrier #2)+20 MHz carrier (carrier #3)+5 MHz carrier (carrier #4).

FIG. 6 illustrates an example of a protocol structure for supporting multiple carriers. A common medium access control (MAC) entity 210 manages a physical (PHY) layer 220 which uses a plurality of carriers. A MAC management message transmitted by a particular carrier may be applied to other carriers. The PHY layer 220 may operate e.g. in a TDD (Time Division Duplex) and/or FDD (Frequency Division Duplex) scheme.

There are several physical control channels used in the physical layer 220. A physical downlink control channel (PDCCH) may inform the UE about the resource allocation of paging channel (PCH) and downlink shared channel (DL-SCH), and hybrid automatic repeat request (HARQ) information related to DL-SCH. The PDCCH may carry the uplink scheduling grant which informs the UE about resource allocation of uplink transmission. A physical control format indicator channel (PCFICH) informs the UE about the number of OFDM symbols used for the PDCCHs and is transmitted in every subframe. A physical Hybrid ARQ Indicator Channel (PHICH) carries HARQ ACK/NAK signals in response to uplink transmissions. A physical uplink control channel (PUCCH) carries uplink control data such as HARQ ACK/NAK in response to downlink transmission, scheduling request and channel quality indicator (CQI). A physical uplink shared channel (PUSCH) carries uplink shared channel (UL-SCH).

Each component carrier may have its own control channel, i.e. PDCCH. Alternatively, only some component carriers may have an associated PDCCH, while the other component carriers do not have their own PDCCH.

Component carriers may be divided into a primary component carrier (PCC) and one or several secondary component carriers (SCCs) depending on whether they are activated. A PCC may be constantly activated, and an SCC may be activated or de-activated according to particular conditions. Activation means that transmission or reception of traffic data is performed or traffic data is ready for its transmission or reception. Deactivation means that transmission or reception of traffic data is not permitted. In the deactivation, measurement is made or minimum information can be transmitted or received. The UE generally uses only a single PCC and possibly one or more SCCs along with the PCC.

A PCC is a component carrier used by a BS (i.e. an eNB in the context of LTE/LTE-A) to exchange traffic and PHY/MAC control signaling (e.g. MAC control messages) with a UE. SCCs carriers are additional component carriers which the UE may use for traffic, only per BS's specific commands and rules received e.g. on the PCC. The PCC may be a fully configured carrier, by which major control data is exchanged between the BS and the UE. In particular, the PCC is configured with PDCCH. The SCC may be a fully configured component carrier or a partially configured component carrier, which is allocated according to a request of the UE or according to an instruction of the BS. The PCC may be used for entering of the UE into a network or for an allocation of the SCC. The primary carrier may be selected from among fully configured component carriers, rather than being fixed to a particular component carrier. A component carrier set as an SCC carrier may be changed to a PCC.

A PCC may further have at least some of the following characteristics:
- to be in accordance with the definitions of the PCC introduced in Rel-10 CA;
- uplink PCC and downlink PCC may be configured per UE;
- uplink PCC may be used for transmission of L1 uplink control data;
- downlink PCC cannot be de-activated;
- re-establishment may be triggered when the downlink PCC experiences RLF (radio link failure), not when other downlink CC's experience RLF;
- SI (system information) reception for the downlink PCC, Rel-8 procedures may apply;
- this may not imply anything for the reception of the SI of other configured CC's;
- NAS information may be taken from the downlink PCC cell.

In LTE FDD (frequency division duplex) system, DL (downlink) and UL (uplink) carrier are always paired, i.e. there is a one-to-one association/linkage between the DL and UL carrier. In LTE-Advanced system with carrier aggregation, several component carriers are aggregated to provide higher peak data rate. The transmission on multiple CCs with symmetric or asymmetric DL/UL component carriers are both supported.

The UE DL Component Carrier Set is defined as the set of DL component carriers configured by dedicated signalling on which a UE may be scheduled to receive the PDSCH (Physical Downlink Shared Channel) in the DL.

The PDCCH Monitoring Set is defined as a set of DL CCs on which the UE is required to monitor the PDCCH (Physical Downlink Control Channel). Its size is less than or equal to the size of the UE DL CC set and it comprises only CCs that are in the UE DL CC set.

Power headroom reports (PHR) provides information to the eNB on how close the UE is operating to its maximum transmission power capabilities. This information is needed for packet scheduling and link adaptation. For example, being aware of the fact that a UE is operating at its maximum transmission power, the eNB can also know that allocating more physical resource blocks to that UE will results in a drop of its experienced SINR (Signal to Interference-plus-Noise Ratio). In carrier aggregation, if there is more than one UL CC, individual power headroom reporting is necessary.

DISCLOSURE OF INVENTION

Technical Problem

In Rel-8/9, there was only one carrier. Accordingly, in Rel-8/9, per CC PHR is used. However, in Rel-10, transmitted power can be distributed to multiple CCs (component carriers). Therefore, in Rel-10, even if all CCs report their PHR at the same time, the eNB is not able to calculate the true Power Headroom (PH) for a UE, since there may different RF architecture, for example single Power Amplifier (PA) or multiple PA, and/or power reduction MPR or power scaling at UE which is unknown to the eNB.

Solution to Problem

To improve this situation, the invention proposes a method for a user equipment configured in carrier aggregation mode to assist an e Node B in estimating the total available output power for each component carrier, the method comprising reporting from the user equipment to the e Node B at least one of:
- RF architecture information of the user equipment, said information comprising at least one of:
  - the number of power amplifiers available in the user equipment and
  - a mapping information between the at least one power amplifier of the user equipment and the component carriers, and
- at least one power parameter value of the user equipment used by the user equipment for adapting the maximum output power.

The invention also proposes a computer program storing instruction codes for carrying out a method according to the invention when executed by a processor.

The invention also proposes a non transitory computer readable storage medium storing a computer program according to the invention.

The invention also proposes a user equipment configured for carrier aggregation with an e Node B, comprising:
- a memory for storing a computer program according to the invention as well as information comprising at least one of:

RF architecture information of the user equipment, said information comprising at least one of:
the number of power amplifiers available in the user equipment and
a mapping information between the at least one power amplifier of the user equipment and the component carriers, and
at least one power parameter value of the user equipment used by the user equipment for adapting the maximum output power,
and
a transmitter for reporting said stored information to the e Node B.

The invention also proposes an e Node B arranged to carry out carrier aggregation with a user equipment, the e Node B comprising a receiver set to receive at least one of:
RF architecture information of the user equipment, said information comprising at least one of:
the number of power amplifiers available in the user equipment and
a mapping information between the at least one power amplifier of the user equipment and the component carriers, and
at least one power parameter value of the user equipment used by the user equipment for adapting the maximum output power, and
a processor arranged to estimate the total available output power of the user equipment for each component carrier, based on the received information.

Advantageous Effects of Invention

Such method is advantageous, in particular in that it improves scheduling decisions by the e Node B. The method enables the provision (from a user equipment to an e Node B) of additional information allowing an improved management of multiple carrier scheduling by an e Node B (a.k.a eNB). The eNB can, for example, obtain an accurate estimate of the transmit power and the available transmit power when making scheduling decision.

Such user equipment is advantageous in that it is able to provide additional information to an e Node B, thereby allowing an improved management of multiple carrier scheduling by an e Node B.

Such e Node B is advantageous in that it is able to received from a user equipment additional information (not available in state of the art e Node Bs), and to process such additional information in order to improve its management of multiple carrier scheduling.

BRIEF DESCRIPTION OF DRAWINGS

Embodiments of the present invention are illustrated by way of example, and not by way of limitation, in the figures of the accompanying drawings, in which like reference numerals refer to similar elements and in which.

BEST MODE FOR CARRYING OUT THE INVENTION

The invention will be described hereafter in the context of an LTE-A system supporting carrier aggregation as mentioned above. It applies however to any other type of system including at least one base station and at least one UE or equivalent, as will be apparent to one skilled in the art.

Figure 1:
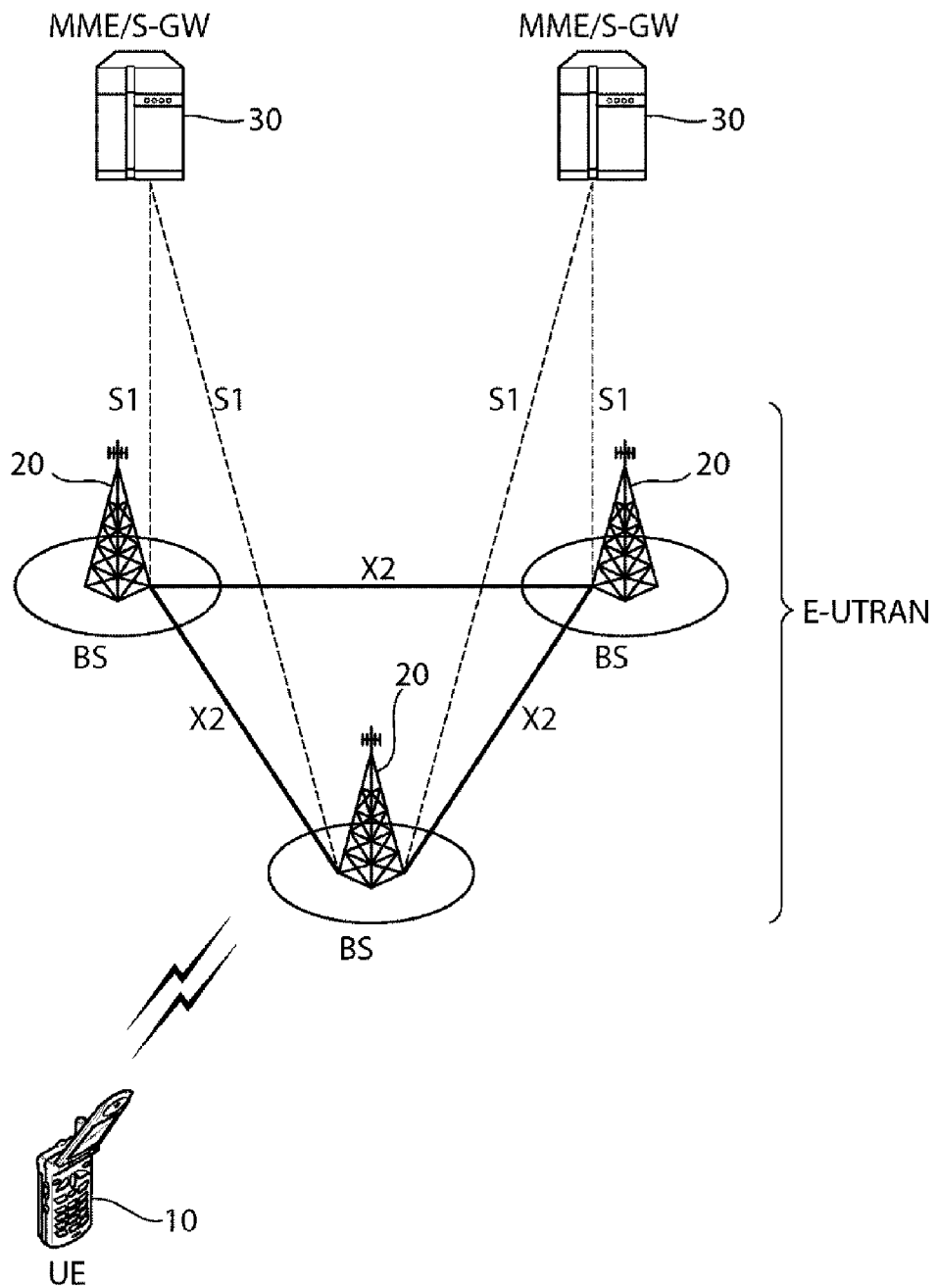
FIG. 1 is a diagram showing an exemplary radiocommunication system.
Figure 2:
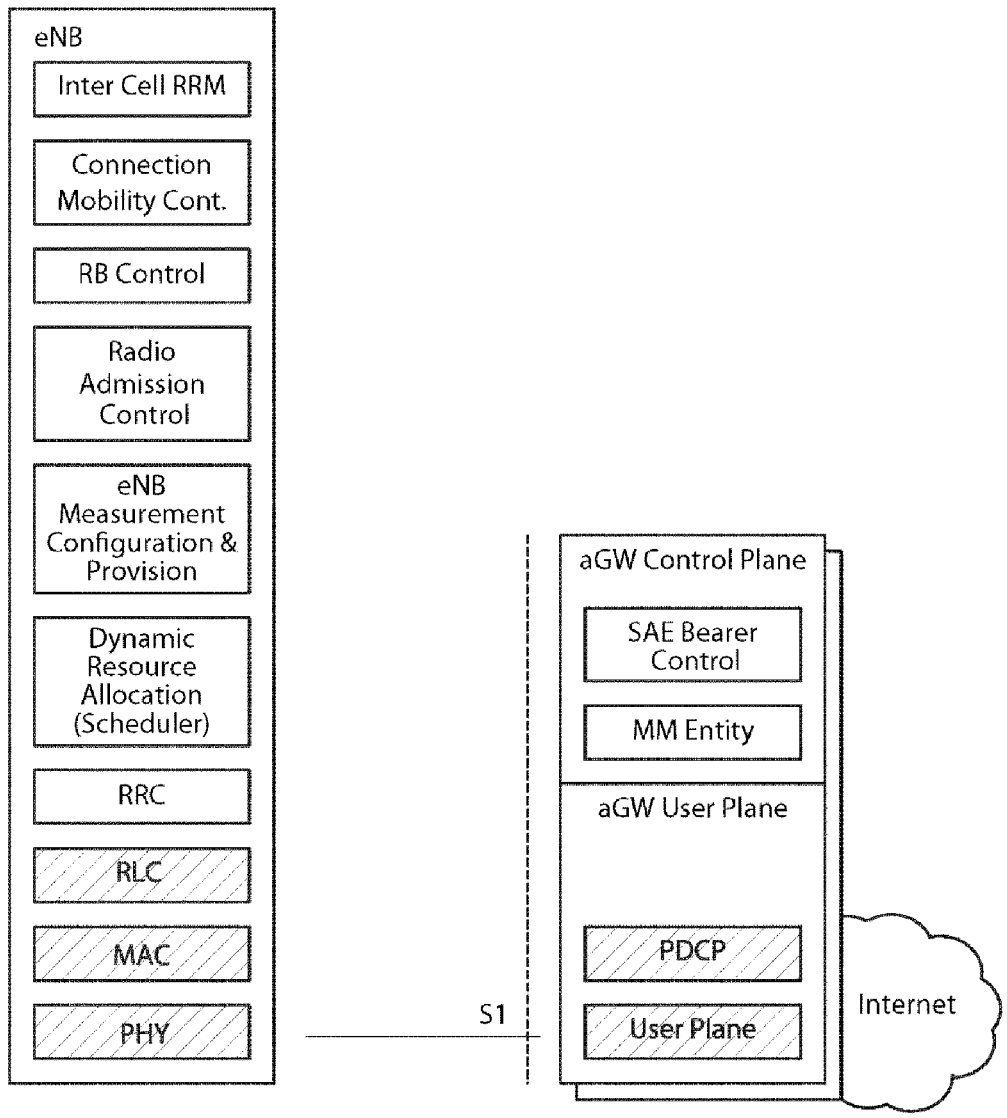
FIG. 2 is a diagram showing an exemplary overview of an E-UTRAN architecture.
Figure 3:
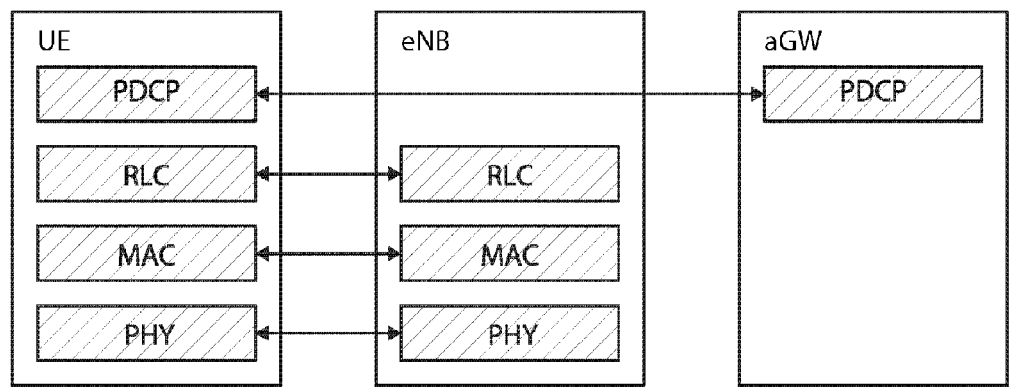
FIG. 3 is a diagram showing an exemplary user-plane protocol stack for E-UTRAN.
Figure 4:
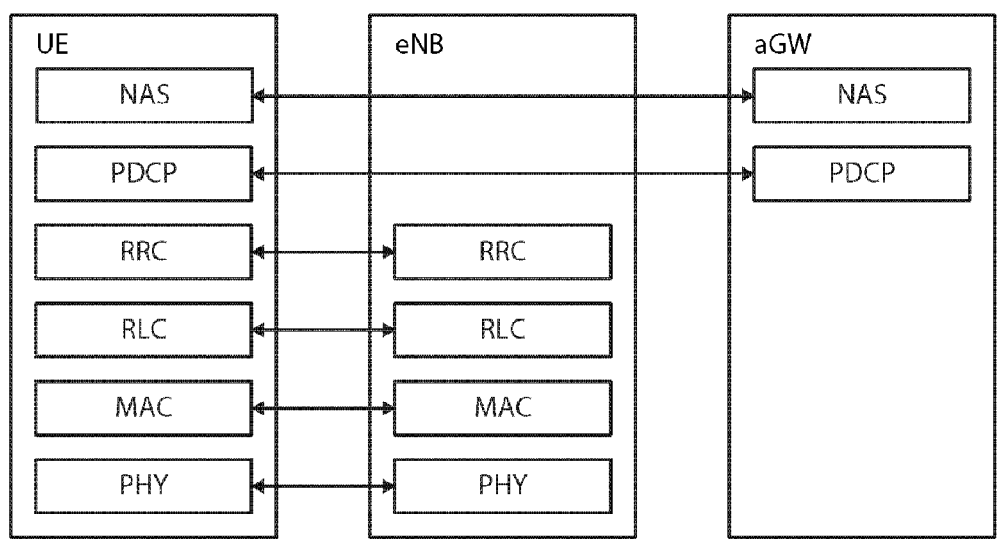
FIG. 4 is a diagram showing an exemplary control-plane protocol stack for E-UTRAN.
Figure 5:
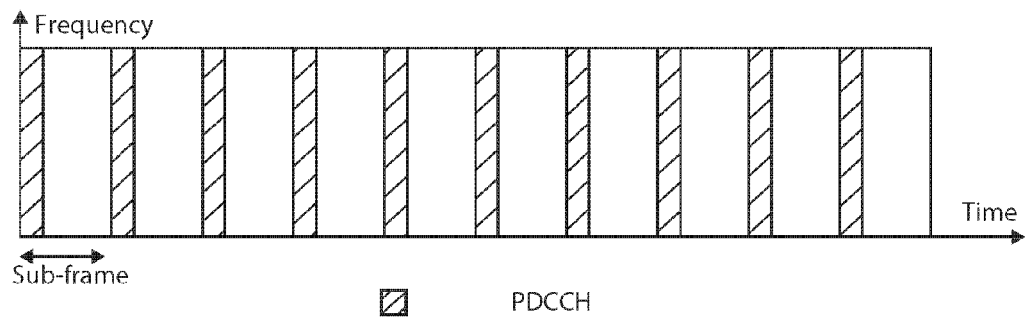
FIG. 5 is a diagram schematically showing a PDCCH channel arrangement.
Figure 6:
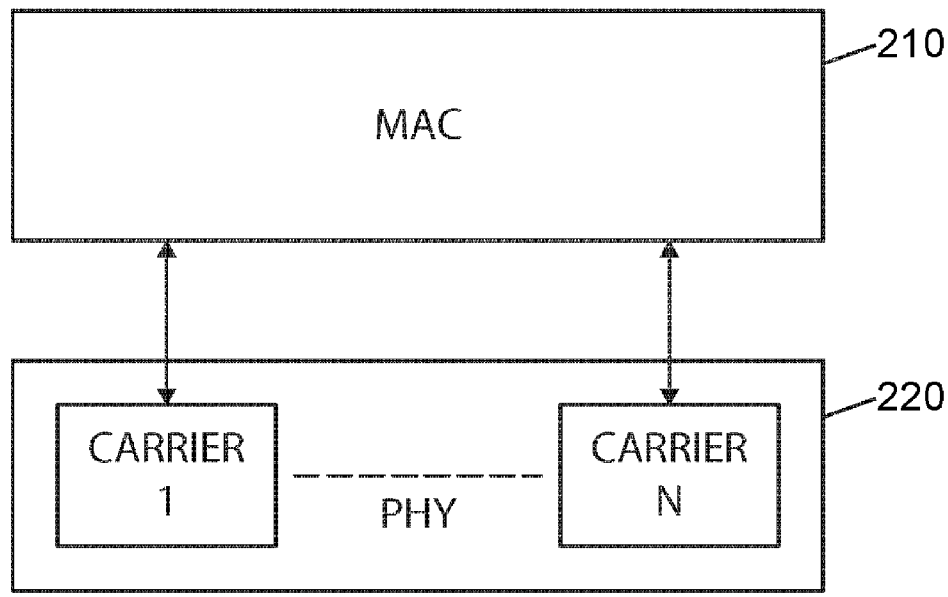
FIG. 6 is a diagram showing an exemplary protocol structure for supporting multiple carriers (carrier aggregation)
Figure 7:
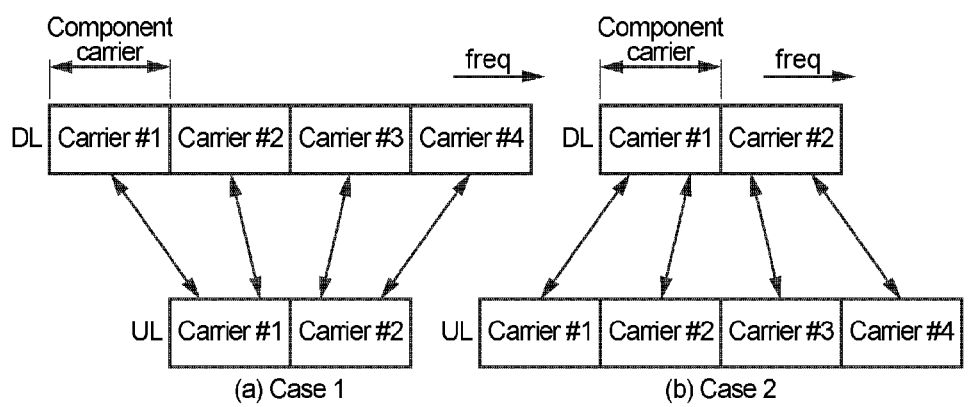
FIG. 7 illustrates reference models for asymmetric DL/UL carrier aggregation.
Figure 8:
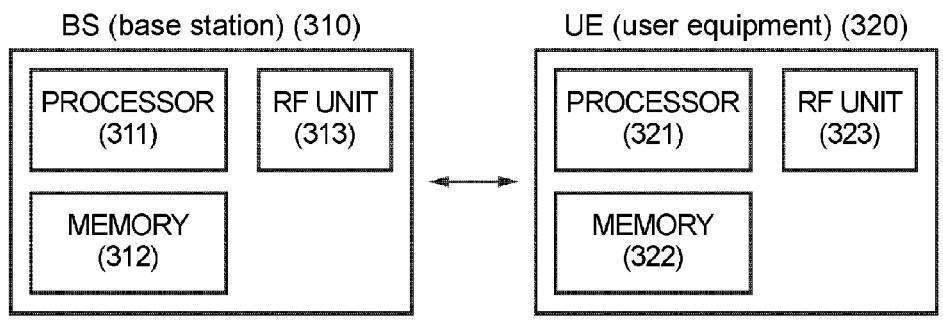
FIG. 8 illustrates an exemplary and non-limiting wireless communication system.

FIG. 8 shows an exemplary and non-limiting wireless communication system including a BS 310 and one or more UE(s) 320. In downlink, a transmitter may be a part of the BS 310, and a receiver may be a part of the UE 320. In uplink, a transmitter may be a part of the UE 320, and a receiver may be a part of the BS 310. The BS 310 may include a processor 311, a memory 312, and a radio frequency (RF) unit 313. The processor 311 may be configured to implement proposed procedures and/or methods described in the present document. In the exemplary system of FIG. 8, the memory 312 is coupled with the processor 311 and stores a variety of information to operate the processor 311. The RF unit 313 is coupled with the processor 311 and transmits and/or receives a radio signal.

The UE 320 may include a processor 321, a memory 322, and a RF unit 323. The processor 321 may be configured to implement proposed procedures and/or methods described in the present document. The memory 322 is coupled with the processor 321 and stores a variety of information to operate the processor 321. The RF unit 323 is coupled with the processor 321 and transmits and/or receives a radio signal.

The BS 310 and/or the UE 320 may have single antenna or multiple antennas. When at least one of the BS 310 and the UE 320 has multiple antennas, the wireless communication system may be called a multiple input multiple output (MIMO) system.

The BS 310 and the UE 320 support carrier aggregation, meaning that they may use multiple component carriers (CCs).

Among the multiple CCs, one or several CCs may be configured with a Physical Downlink Control Channel, PDCCH, received by the UE 320 from the BS 310. The PDCCH configured on a given CC may be arranged for scheduling resources on a physical shared channel, e.g. a PDSCH or PUSCH, to the UE 320 on said given CC only. It may also be arranged for scheduling resources on a physical shared channel, e.g. a PDSCH or PUSCH, to the UE 320 on at least one other CC among the multiple CCs (only or in addition to scheduling resources on a physical shared channel on said given CC).

According to a possible embodiment, a method for a user equipment configured in carrier aggregation mode to assist an e Node B in estimating the total available output power for each component carrier comprises reporting from the user equipment to the e Node B at least one of RF architecture information of the user equipment, and at least one power parameter value. Such reporting may be implemented, for example, with a computer program executed by the user equipment. Such reporting could also be implemented with hardwired logic inside the user equipment, FPGAs, etc. The program (or other alternatives such as hardwired logic/FPGAs) may, for example, direct a transmitter of the user equipment to report such specific relevant information to the e Node B (as opposed to a general purpose I/O program which would merely transmit data irrespective of the actual meaning of the data). Architecture information comprises at least one of: the number of power amplifiers available in the user equipment, and a mapping information between the at least one power amplifier of the user equipment and the component carriers. The at least one power parameter value of the user equipment is one that can be used by the user equipment for adapting the maximum output power. The e Node B can, accordingly, make relevant scheduling decisions.

According to a second possible embodiment, a method according to the invention involves a user equipment using a same power amplifier for at least two component carriers. The method is particularly advantageous, since in such context prior art methods could lead to misleading information being transmitted to the e Node B. An e Node B can, according to such embodiment, identify that the power available on one component carrier and the power available on the other component carrier overlap (since both component carriers are served by the same power amplifier).

According to a possible embodiment, a method according to the aforementioned second embodiment comprises, whenever the user equipment needs to send a power headroom report for a given component carrier to the e Node B, sending, from the user equipment, a power headroom report containing a total aggregated power for all component carriers mapped to the same power amplifier as said component carrier (instead of the power for only said component carrier, which could be misleading).

According to a fourth possible embodiment the user equipment uses at least two power amplifiers and is configured with at least two component carriers, the first power amplifier being associated with only the first component carrier and the second power amplifier being associated with only the second component carrier.

According to a possible embodiment the method according to the aforementioned fourth embodiment is carried out in a context in which a component carrier is associated with only one power amplifier, and in which said power amplifier is associated with only said component carrier. This is a one to one relationship, as opposed to a situation in which a power amplifier is associated with only one component carrier, but in which such component carrier is associated with several power amplifiers. The method comprises, whenever the user equipment needs to send a power headroom report for such component carrier (which is in one to one relationship with a power amplifier) to the e Node B, sending, from the user equipment, a power headroom report containing the available power for said component carrier.

According to a sixth possible embodiment, the method comprises, when the user equipment reports at least one power parameter value, reporting such at least one power parameter value for each component carrier.

According to a seventh possible embodiment, the method comprises, when the user equipment reports at least one power parameter value, including in such at least one power parameter value at least one of an MPR value, an A-MPR value and a power scaling value.

According to a possible embodiment, the method according to the aforementioned seventh embodiment comprises reporting the MPR and A-MPR values whenever the user equipment connects to a new cell.

According to a possible embodiment, the method according to the aforementioned seventh embodiment comprises reporting the power scaling value whenever the user equipment needs to downscale its maximum output power. Downscaling may be due, for example, to a maximum power limitation of the user equipment, which may be triggered when two component carriers are associated with a single power amplifier.

According to a possible embodiment, the method according to the aforementioned sixth embodiment comprises including in the at least one power parameter value a PCMAX value, and reporting such PCMAX value whenever at least one of transmission bandwidth and type of modulation is changed.

According to a possible embodiment, a computer program stores instruction codes for carrying out the method according to possible embodiments of the invention when executed by a processor. The computer may be split between an e Node B and a user equipment, respective parts of the program being executable by a respective processor (a processor of the user equipment and a processor of the e Node B). The computer program may be written in any appropriate programming language such as C, C++, C#, java, assembly language, Lisp, or other.

According to a possible embodiment, a non-transitory computer readable storage medium (such as a flash memory, a ROM memory, a battery maintained RAM memory, an EEPROM memory, magnetic storage such as hard disk drive, or any other appropriate memory) stores a computer program according to possible embodiments of the invention. Such storage medium may be embedded in the user equipment and/or e Node B).

According to a possible embodiment, a user equipment configured for carrier aggregation with an e Node B comprises:
  a memory (such as a flash memory, a ROM memory, a battery maintained RAM memory, an EEPROM memory, magnetic storage such as hard disk drive, or any other appropriate memory) storing a computer program according to possible embodiments of the invention as well as information comprising at least one of:
    RF architecture information of the user equipment, said information comprising at least one of:
      the number of power amplifiers available in the user equipment and
      a mapping information between the at least one power amplifier of the user equipment and the component carriers, and
    at least one power parameter value of the user equipment used by the user equipment for adapting the maximum output power,
  and
  a transmitter for reporting said stored information to the e Node B.

The transmitter is associated with logic or software for reporting specifically such aforementioned information, as opposed to merely transmitting generic information.

According to a possible embodiment, an e Node B arranged to carry out carrier aggregation with a user equipment comprises a receiver set to receive at least one of:
  RF architecture information of the user equipment, said information comprising at least one of:
    the number of power amplifiers available in the user equipment and
    a mapping information between the at least one power amplifier of the user equipment and the component carriers, and at least one power parameter value of the user equipment used by the user equipment for adapting the maximum output power, and a processor arranged to estimate the total available output power of the user equipment for each component carrier, based on the received information.

The receiver is associated with logic or software for receiving (and letting the e Node B properly process) specifically such aforementioned information, as opposed to merely receiving generic information.

According to embodiments implementing a per CC configuration, resources and complexity may be reduced. Indeed, in certain cases, the eNB can derive enough information from the PHR on one CC and does not need multiple PHRs. However, different MPR/A-MPR may apply to different CCs, so the PCMAX is not necessarily the same for different UL CC.

The PHR defined for Rel.8/9 is defined as the difference between PCMAX and the transmit power. MPR may be incorporated in PCMAX as show below:

$$PCMAX\_L - T(PCMAX\_L) \leq PCMAX \leq PCMAX\_H + T(PCMAX\_H)$$

Where $$-PCMAX\_L = MIN\{PEMAX\_H - \Delta TC, PPower\text{-}Class - MPR - A\text{-}MPR - \Delta TC\}PCMAX\_H = MIN\{PEMAX\_H, PPowerClass\}$$

In Rel. 10, the MPR and A-MPR could vary significantly depending on the PUSCH/PUCCH location and the number of carriers used for transmission. The fact that the MPR/A-MPR could vary significantly from TTI to TTI depending on the grant could raise issues for the reliability of the UL transmission and affect the system performance. Therefore, the following possible embodiments are advantageous.

In one embodiment, PCMAX is defined in such a way that the eNB can estimate the total aggregated transmit power over all CCs using the reports for each carrier.
 a. CCs sharing the same PA
 b. CC(s) with independent PA from other CC(s)

In another embodiment, power reductions parameters (e.g. MPR/-A-MPR, power scaling, etc. . . . ) are reported.

The two embodiments are detailed below.

Reporting the power reduction parameters (MPR/A-MPR, etc.) can be achieved as follows:

The PHR accounts for the maximum power reduction (MPR) and additional MPR (A-MPR) as PCMAX,c (CCspecific maximum transmission power) is the value after these are taken into account. Therefore, PCMAX,c may be different depending on UE implementation.

MPR denotes how much UE is allowed to reduce the maximum transmission power. It used to control out of band emission with the various modulation schemes and the transmission bandwidth. Contrary to Rel-8/9 for LTE A, the UE may have to manage simultaneous PUSCH-PUCCH transmissions, multi cluster scheduling, and simultaneous transmissions on multiple CCs, which may require larger MPR values and cause a larger variation of the applied MPR values compared to Rel-8/9. A-MPR may be used when the network indicates that the UE shall also meet additional requirements in a specific deployment scenario. The exact power reduction may be UE implementation dependent and may be unknown by the network. It may also depend on the used modulation scheme, the resource allocation size, simultaneous transmissions on other CCs and the resource position of the transmission on other CCs (some parameters may be known by the network as they are specified in a Rel. 8/9 specification).

According to possible embodiments, an eNB may know a range of PCMAX_L and PCMAX_H for each CC.

According to possible embodiments, the UE reports the exact power reduction which is function of MPR/A-MPR and additional possible power scaling applied. In such case the eNB is aware of the CC-specific maximum transmission power P_PCMAX,c relative to which the UE calculates the PHR.

Redefining PCMAX such that the eNB can estimate the total aggregated transmit power over all CCs can be achieved as follows.

In LTE-A there are two possible carrier aggregation scenarios: intra-band contiguous carrier aggregation and inter-band carrier aggregation. In the case of intra-band carrier aggregation, it is likely that a single PA would be used for multiple CCs while in inter-band carrier aggregation it is likely that multiple PA would be used for CCs in separate bands. Therefore, according to a possible embodiment, in case multiple CCs share the same PA the maximum sum power over multiple CCs can be limited by the PA total power. Then PCMAX for each CC may be set to reflect the total aggregated transmits power over all CCs in case of contiguous carrier aggregation. A difference between CCs sharing the same PA and CCs not sharing the same PA is that CCs sharing the PA have to consider potential simultaneous transmissions on the other CCs when reporting the PHR. This is illustrated on FIG. 9.

Figure 9:
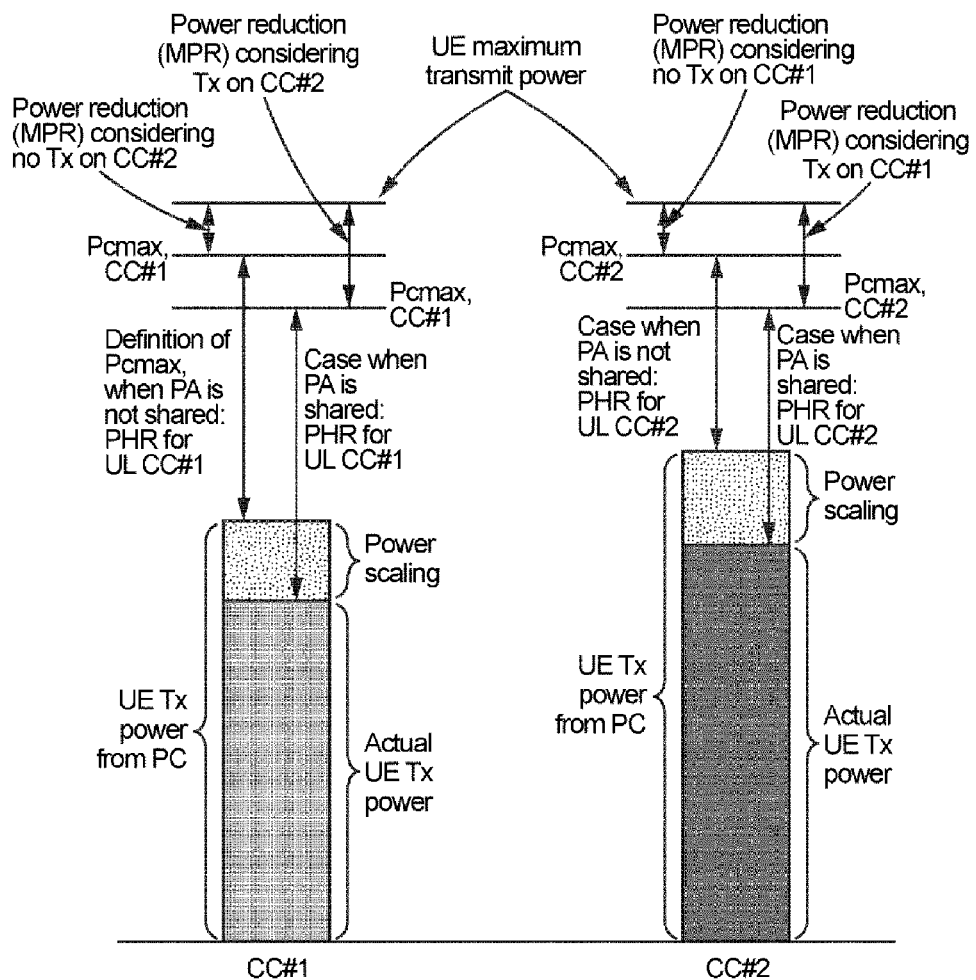
FIG. 9 illustrates the management of two component carriers according to a possible embodiment of the invention.

On FIG. 9, when the PA is shared:

PHR for UL CC#1=$f$(Tx in UL CC#2), and

PHR for UL CC#2=$f$(Tx in UL CC#1).

On FIG. 9, when the PA is not shared:

PHR for UL CC#1 is independent of Tx in CC#2.

PHR for UL CC#2 is independent of Tx in CC#1.

In a possible embodiment, in addition to per CC PHR report, the eNB is provided with explicit or implicit indications that enable the determination, by the eNB, of whether a PA is shared or not among CCs or whether the reported PHR of one CC takes into consideration the transmission on other CCs.

INDUSTRIAL APPLICABILITY

This assists the eNB in finding an accurate estimate of the transmit power and of the available transmit power when making scheduling decision.

The invention claimed is:

1. A method employed by an e Node B for estimating the total available output power for each of a plurality of component carriers when the e Node B is communicating with a user equipment (UE) configured in carrier aggregation mode, the method comprising:
 receiving, by the e Node B, a power headroom report and power reduction for a first component carrier among the plurality of component carriers;
 estimating total available output power of the first component carrier based on the power headroom report and power reduction; and
 making a scheduling decision based on the total available output power of the first component carrier,
 wherein the power reduction is a function of a Maximum Power Reduction (MPR) or an Additional-Maximum Power Reduction (A-MPR) additional possible power scaling applied based on the RF architecture of the UE, wherein the power headroom report contains a total aggregated power for all component carriers and a value of power reduction is a first value when the same power amplifier is associated with the first component carrier and a second component carrier based on the RF architecture of the UE, and wherein the power headroom report contains an available power for the first component carrier and a value of power reduction is a second value when the first power amplifier is associated with only the first component carrier and the second power amplifier is associated with only the second component carrier based on the RF architecture of the UE.

2. The method according to claim 1, wherein, when the user equipment reports the power reduction, the power reduction is reported for each component carrier.

3. The method according to claim 2, wherein the at least one power parameter value comprises a maximum transmission power (PCMAX) value which is reported whenever at least one of transmission bandwidth and type of modulation is changed.

4. The method according to claim 1, wherein the MPR and A-MPR values are reported whenever the user equipment connects to a new cell.

5. The method according to claim 1, wherein the power scaling value is reported whenever the user equipment needs to downscale its maximum output power.

6. The method according to claim 1, a computer program storing instruction codes for carrying out the method for a user equipment configured in carrier aggregation mode to assist an e Node B in estimating the total available output power for each component carrier when executed by a processor.

7. A non transitory computer readable storage medium storing the computer program according to claim 6.

8. A user equipment (UE) configured for carrier aggregation with an e Node B, comprising:
a memory to store a computer program and information;
a Radio Frequency (RF) unit to transmit and receive a radio signal; and
a processor to control the memory and the RF unit,
wherein the RF unit is further configured to transmit, to the e Node B, a power headroom report and power reduction for a first component carrier among a plurality of component carriers,
wherein the power reduction is a function of a Maximum Power Reduction (MPR) or an Additional-Maximum Power Reduction (A-MPR) additional possible power scaling applied based on the RF architecture of the UE,
wherein the power headroom report contains a total aggregated power for all component carriers and a value of power reduction is a first value when the same power amplifier is associated with the first component carrier and a second component carrier based on the RF architecture of the UE, and
wherein the power headroom report contains an available power for the first component carrier and a value of power reduction is a second value when the first power amplifier is associated with only the first component carrier and the second power amplifier is associated with only the second component carrier based on the RF architecture of the UE.

9. An e Node B arranged to carry out carrier aggregation with a user equipment (UE), the e Node B comprising:
a memory to store a computer program and information;
a Radio Frequency (RF) unit to transmit and receive a radio signal; and
a processor to control the memory and the RF unit,
wherein the RF unit is further configured to receive, from the UE, a power headroom report and power reduction for a first component carrier among a plurality of component carriers,
wherein the power reduction is a function of a Maximum Power Reduction (MPR) or an Additional-Maximum Power Reduction (A-MPR) additional possible power scaling applied based on the RF architecture of the UE,
wherein the power headroom report contains a total aggregated power for all component carriers and a value of power reduction is a first value when the same power amplifier is associated with the first component carrier and a second component carrier based on the RF architecture of the UE,
wherein the power headroom report contains an available power for the first component carrier and a value of power reduction is a second value when the first power amplifier is associated with only the first component carrier and the second power amplifier is associated with only the second component carrier based on the RF architecture of the UE, and
wherein the processor is further configured to estimate total available output power of the first component carrier based on the power headroom report and power reduction, and make a scheduling decision based on the total available output power of the first component carrier.

* * * * *